(12) United States Patent
Houry (10) Patent No.: US 6,203,034 B1
(45) Date of Patent: Mar. 20, 2001

(54) TRANSPORTABLE CONTAINER

(75) Inventor: Robert L. Houry, Chesterfield, MO (US)

(73) Assignee: Contico International, LLC, St. Louis, MO (US)

( * ) Notice: Subject to any disclaimer, the term of this patent is extended or adjusted under 35 U.S.C. 154(b) by 0 days.

(21) Appl. No.: 09/231,619

(22) Filed: Jan. 14, 1999

(51) Int. Cl.$^7$ ........................................................ B62B 3/00
(52) U.S. Cl. ........................................ 280/47.34; 220/769
(58) Field of Search ................................ 280/47.34, 47.26, 280/47.24, 47.29, 47.17, 47.2, 47.35, 79.2, 79.5; 16/43, 38; 220/769, DIG. 14, DIG. 15, DIG. 12

(56) References Cited

U.S. PATENT DOCUMENTS

| | | |
|---|---|---|
| D. 303,307 | 9/1989 | Juergens . |
| D. 311,621 | 10/1990 | Fuller . |
| D. 352,584 | 11/1994 | Boyd . |
| D. 361,186 | 8/1995 | Kowalski et al. . |
| D. 361,191 | 8/1995 | Kowalski et al. . |
| D. 381,164 | 7/1997 | Prout et al. . |
| D. 383,279 | 9/1997 | Brescia et al. . |
| 2,973,546 * | 3/1961 | Roche ........................................ 16/43 |
| 3,230,575 * | 1/1966 | Schultz, Jr. ................................ 16/43 |
| 3,858,929 | 1/1975 | Brescia . |
| 4,167,271 * | 9/1979 | Jorgensen ............................. 280/79.1 |
| 4,282,629 | 8/1981 | Demrick et al. . |
| 4,361,930 | 12/1982 | Seesengood . |

(List continued on next page.)

OTHER PUBLICATIONS

Rubbermaid Commercial Products, Inc., 1995–1996 Sanitary Products Catalog.
Dandux Tilt Trucks Advertisement (Circa 1996).
Chem–Tainer Industries, Inc. "Maxi–Movers" Catalog (Circa 1996).
Toter Incorporated "2 Cubic Yard Mobile Truck" (Circa 1996).

Primary Examiner—Brian L. Johnson
Assistant Examiner—Gerald Klebe
(74) Attorney, Agent, or Firm—Howell & Haferkamp, LC (57) ABSTRACT

A transportable container comprises a container body, a handle, a sleeve member, and a caster assembly. The container body includes a base and a plurality of sidewalls extending generally upwardly from the base to define a container interior. One of the container sidewalls constitutes a generally vertical first sidewall. The handle includes a hand-engageable portion and a mounting portion, which extends from the hand-engageable portion. The first sidewall includes a flange, which comprises an upper edge margin of the first sidewall. The flange includes an outwardly extending first flange portion and a downwardly extending second flange portion. The first sidewall, first flange portion and second flange portion together define a socket, which is adapted to receive the mounting portion of the handle therein for mounting of the handle to the container body. The container body also includes a caster socket formed therein. The caster socket has an interior surface with a closed upper end and an open lower end. The sleeve member has an outer surface adapted for engagement with the interior surface of the caster socket. The caster socket is sized to receive the sleeve member therein in a frictional engagement. The sleeve member has an axial hole extending from a bottom end of the sleeve member toward a top end of the sleeve member. The caster assembly has a pintle. The axial hole in the sleeve member is sized to receive the pintle of the caster assembly therein for mounting the caster assembly to the container body. The container body is formed from a curable polymeric material.

30 Claims, 8 Drawing Sheets

U.S. PATENT DOCUMENTS

| | | |
|---|---|---|
| 4,511,154 | 4/1985 | Daloisio . |
| 4,749,101 | 6/1988 | Durkan, Jr. . |
| 4,788,741 * | 12/1988 | Hilborn ................. 16/35 R |
| 5,183,280 * | 2/1993 | Gresch ................. 280/79.5 |
| 5,318,315 | 6/1994 | White et al. . |
| 5,683,097 * | 11/1997 | Fenton et al. ................. 280/655.1 |
| 5,692,761 * | 12/1997 | Havlovitz ................. 280/33.994 |
| 5,704,625 * | 1/1998 | Presnell et al. ................. 280/79.2 |
| 6,027,128 * | 2/2000 | Stich et al. ................. 280/47.16 |
| 6,086,073 * | 7/2000 | Tisbo et al. ................. 280/47.26 |
| 6,145,856 * | 11/2000 | Conti ................. 280/47.26 |

* cited by examiner

TRANSPORTABLE CONTAINER

BACKGROUND OF THE INVENTION

This invention relates generally to containers for holding and transporting various materials. More particularly, this invention pertains to large, wheeled containers, commonly referred to as "tilt trucks", for holding, transporting and dumping heavy or bulky materials.

Prior art tilt trucks comprise a polyethylene container body having a base, a front end wall, a rear end wall, opposite left and right side walls, and an open top. Usually, one of the front and rear end walls slants away from the other so that the tilt truck can be "tilted" onto the slanted end wall to unload the contents of the tilt truck. In some prior art tilt trucks, the container body is mounted within a separate steel frame for added support. Many prior art tilt trucks include a handle mounted to the front or rear end wall, and a plurality of wheels and/or casters mounted to the base of the container body.

In some prior art tilt trucks, the handle is bolted, welded, or otherwise mechanically fastened directly to one of the end walls of the tilt truck. Consequently, all vertical, lateral, and longitudinal (forward and rearward) forces applied to the handle during use are borne by that one end wall, which can present a problem, especially when particularly heavy loads are being carried. Also, in tilt trucks having a handle mounted to an end wall with mechanical fasteners, portions of the fasteners pass through holes in the end wall and are exposed to the contents of the tilt truck. If the metal fasteners rust, the contents of the tilt truck may become contaminated.

Prior art tilt trucks usually include a plurality of wheels and/or casters mounted to the base of the container body. Typically, a standard caster assembly is secured to a metal mounting plate, and the plate is bolted to the underside of the base of the container body. These mounting arrangements are cumbersome and increase the cost of manufacturing the tilt truck. Also, portions of the bolts used to fasten the mounting plates to the base pass through holes in the base and are exposed to the contents of the tilt truck.

SUMMARY OF THE INVENTION

The shortcomings of the prior art are overcome by the present invention, which provides a transportable container with improved handle and caster mounting arrangements. It is an object of the present invention to provide a transportable container having handle and caster mounting arrangements that are less likely to contaminate the contents of the container. Another object is to provide a transportable container having a simple, yet sturdy handle mounting arrangement with fewer parts. Still another object is to provide a transportable container with a caster mounting arrangement having improved retentive properties to more securely position and hold a caster assembly. Yet another object is to provide a transportable container having an integral caster socket. A further object is to provide an improved method for mounting a caster assembly to the container body of a transportable container without the need for mechanical fasteners.

In general, a transportable container of the present invention comprises a container body and a handle. The container body includes a base and a plurality of sidewalls extending generally upwardly from the base to define a container interior. One of the container sidewalls constitutes a generally vertical first sidewall. The first sidewall has an interior side and an exterior side. The handle includes a hand-engageable portion and a mounting portion, which extends from the hand-engageable portion. The first sidewall includes a flange, which comprises an upper edge margin of the first sidewall. The flange includes an outwardly extending first flange portion and a downwardly extending second flange portion. The first sidewall, first flange portion and second flange portion together define a socket, which is adapted to receive the mounting portion of the handle therein for mounting of the handle to the container body.

In another aspect of the present invention, a transportable container comprises a container body, a sleeve member, and a caster assembly. The container body includes a caster socket formed therein. The caster socket has an interior surface with a closed upper end and an open lower end. The sleeve member has an outer surface adapted for engagement with the interior surface of the caster socket. The caster socket is sized to receive the sleeve member therein in a frictional engagement. The sleeve member has an axial hole extending from a bottom end of the sleeve member toward a top end of the sleeve member. The caster assembly has a pintle. The axial hole in the sleeve member is sized to receive the pintle of the caster assembly therein for mounting the caster assembly to the container body.

Generally, a method of the present invention is for mounting a caster assembly to a transportable container. The method comprises the steps of forming a container body from a curable polymeric material in a manner so that the container body has a caster socket formed therein, the caster socket having an interior surface with a closed upper end and an open lower end; providing a sleeve member having an outer surface adapted for engagement with the interior surface of the caster socket; inserting the sleeve member into the caster socket before the curable polymeric material of the container body is fully cured; and allowing the curable polymeric material of the container body to fully cure.

Other objects and features will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENTS

Figure 1:
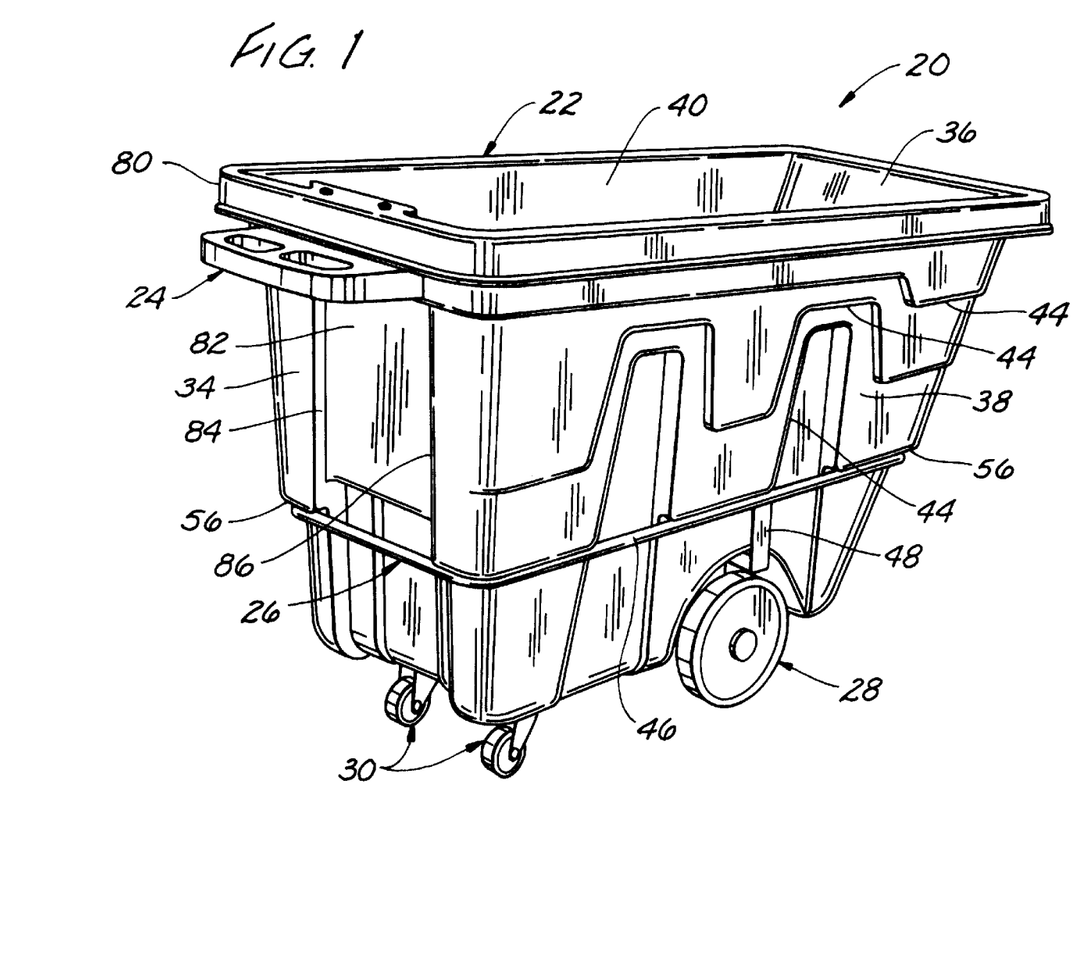
FIG. 1 is a perspective view of a transportable container of the present invention.

The transportable container of the present invention is represented generally by the reference numeral 20 in FIG. 1.

In general, the transportable container 20 comprises a container body 22, a handle 24, a support frame 26, a pair of rear wheels 28 and a pair of front caster assemblies 30.

Preferably, the container body 22 is of a polymeric material, such as high-density polyethylene, rotationally molded as a monolithic piece. However, other suitable materials may be used, and other methods for forming the container body 22 may be employed, without departing from the scope of the present invention. The container body 22 includes a base 32 (see FIG. 6), a front end wall 34, a rear end wall 36, a first side wall 38 and a second side wall 40. The front end wall 34, rear end wall 36, and first and second side walls 38 and 40 extend generally upwardly from the perimeter of the base 32 to define an interior of the container body 22. Preferably, the rear end wall 36 slants away from the front end wall 34 to facilitate "tilting" of the container 20 onto the rear end wall 36 to unload its contents. It should be understood that use of the terms "end wall" and "side wall" throughout the specification and claims is not intended to be limiting, as these terms could be interchanged without departing from the scope of the present invention.

Preferably, the handle 24 is mounted to the front end wall 34, and the front caster assemblies 30 and rear wheels 28 are mounted to the base 32. The details of the mounting arrangements for the handle 24, rear wheels 28 and front caster assemblies 30 are discussed below.

Figure 2:
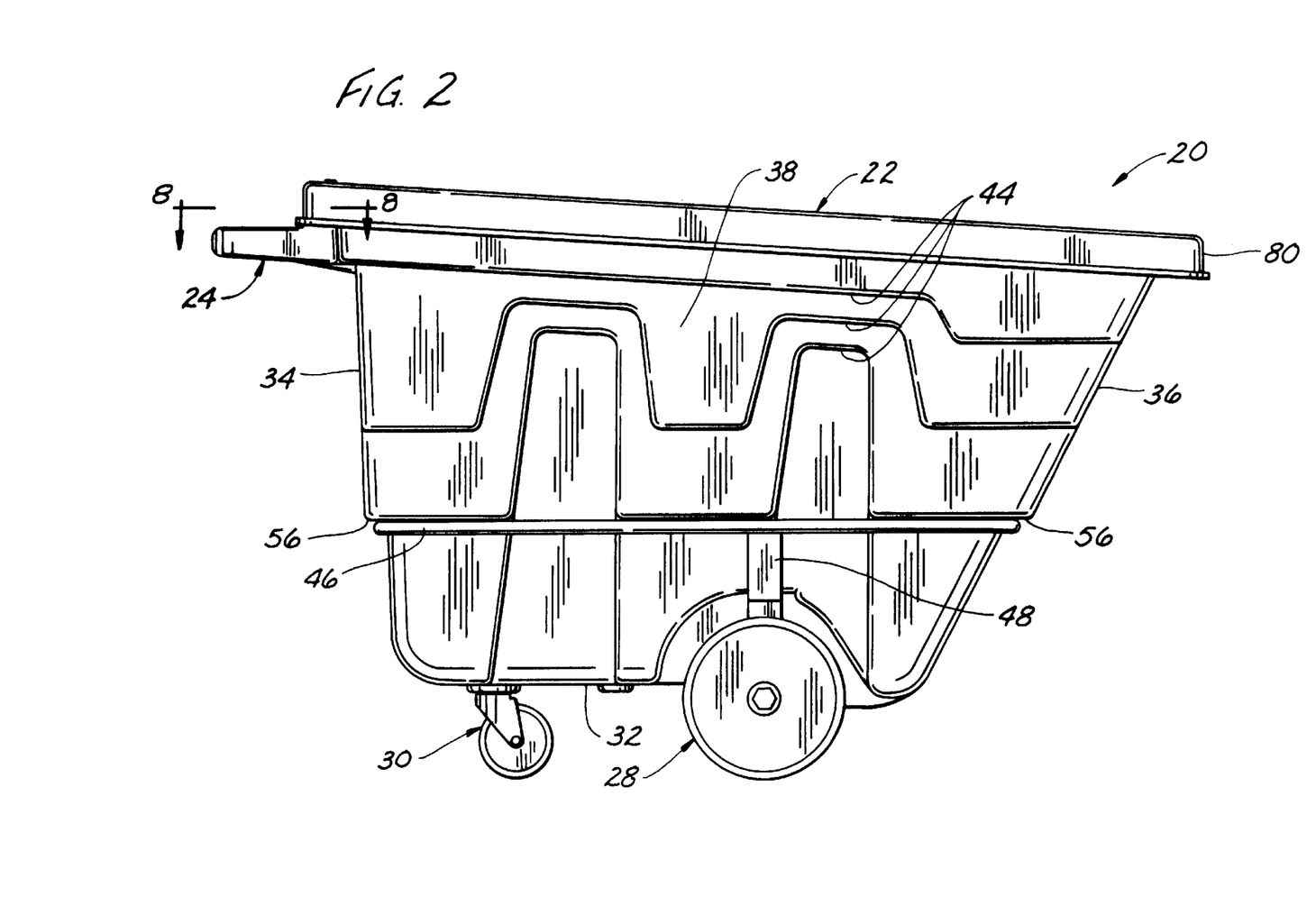
FIG. 2 is a right side elevational view of the transportable container of FIG. 1, the left side elevational view being a mirror image thereof.
Figure 3:
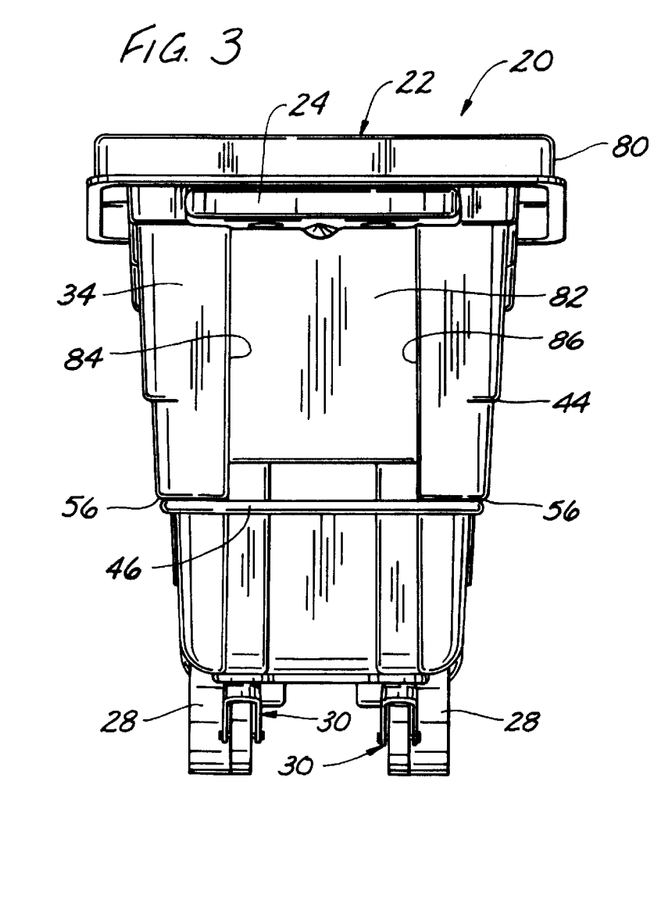
FIG. 3 is a front end elevational view of the transportable container of FIG. 1.
Figure 4:
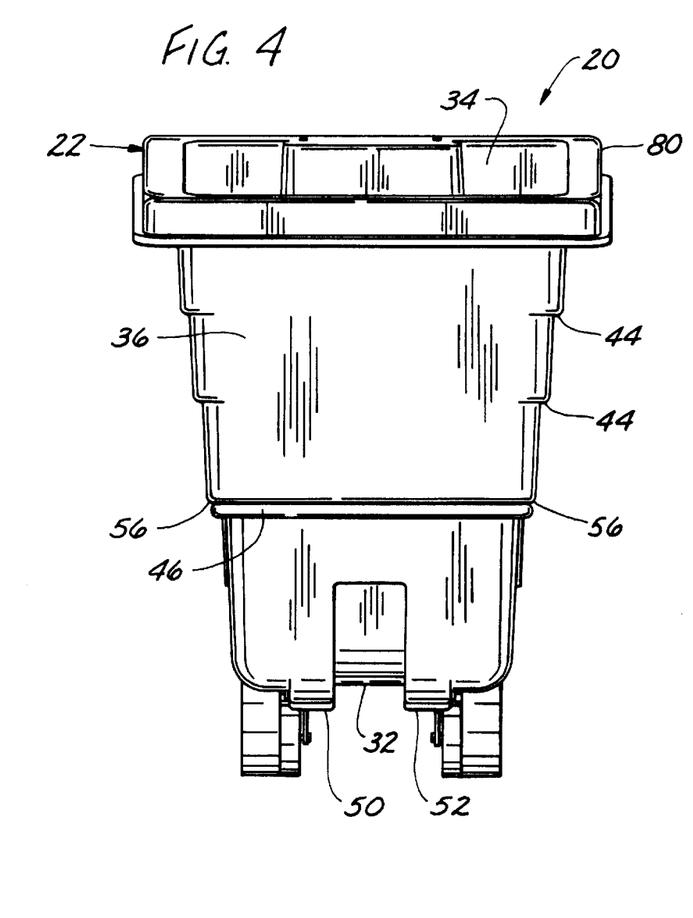
FIG. 4 is a rear end elevational view of the transportable container of FIG. 1.
Figure 5:
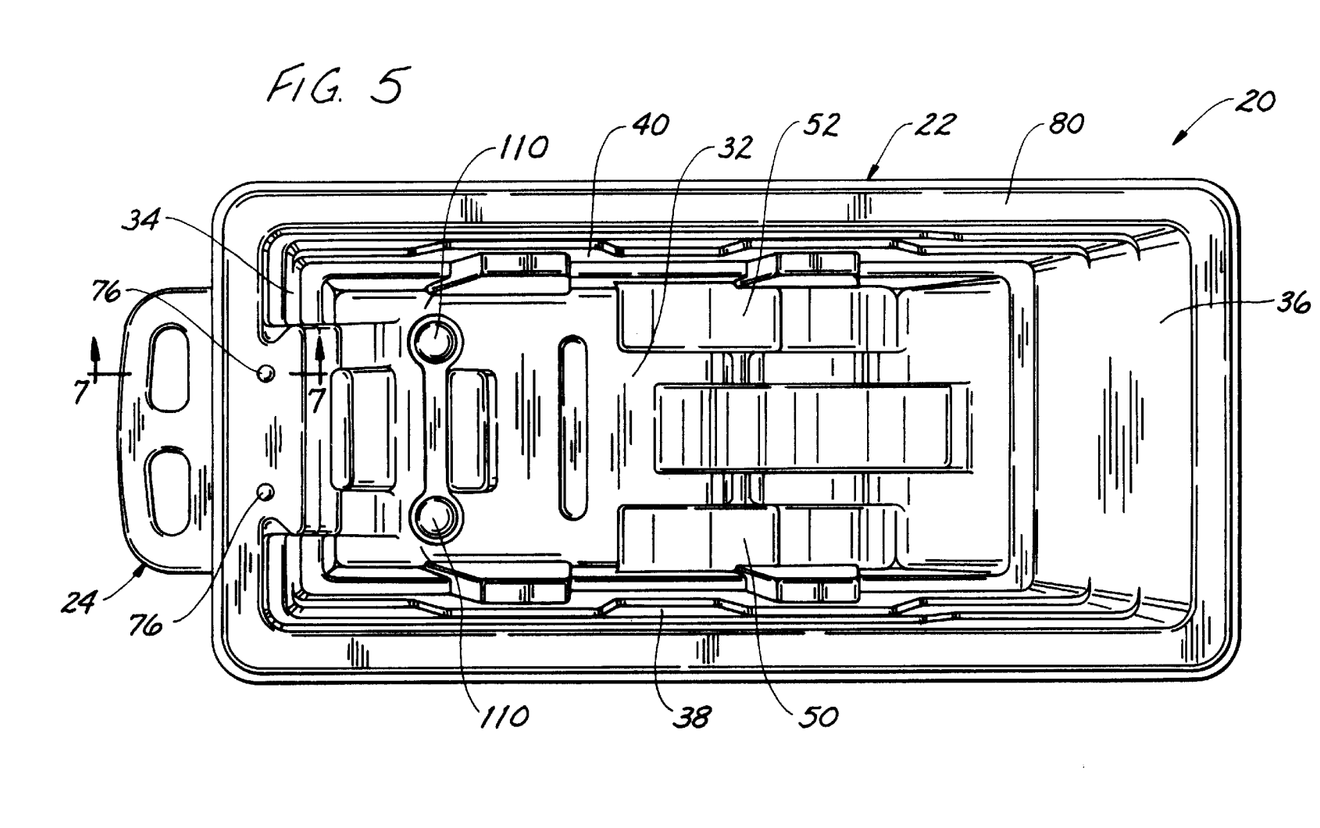
FIG. 5 is a top plan view of the transportable container of FIG. 1.
Figure 6:
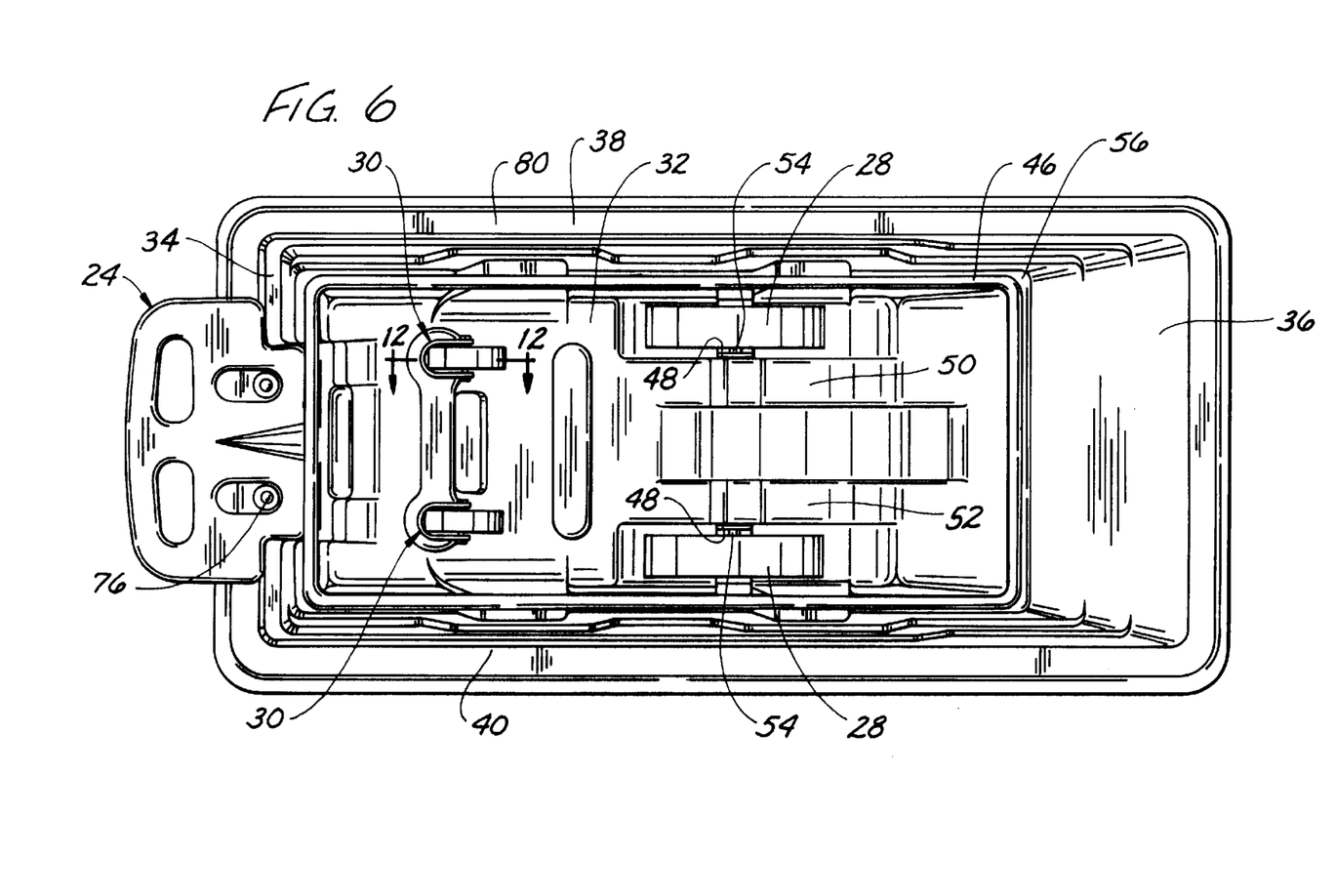
FIG. 6 is a bottom plan view of the transportable container of FIG. 1.

As shown in FIGS. 1 and 2, the side walls 38 and 40 of the container body 22 preferably include a plurality of ridges 44 for improving the aesthetic appearance of the container 20 and for added strength. The ridges 44 add support to the otherwise flat surfaces of the side walls 38 and 40, and help to minimize warping or bowing. The container body 22 may be mounted within the support frame 26, for further lateral support of the side walls 38 and 40. The support frame 26 includes a generally rectangular support member 46 that surrounds the container body 22 and a pair of mounting arms 48 that extend downwardly from the support member 46 adjacent the rear wheels 28. As shown in FIGS. 4 and 6, the base 32 of the container body 22 includes a pair of integral axle bearings 50 and 52, which support an axle 54 (see FIG. 6) for mounting the rear wheels 28 to the container body 22. Each of the mounting arms 48 of the support frame 26 includes a hole (not shown) through which the axle 54 passes when the container body 22 is mounted within the support frame 26. Each of the front end wall 34, rear end wall 36, and first and second side walls 38 and 40 includes a generally horizontal shoulder 56, which rests against the support member 46 of the support frame 26.

Figure 7:
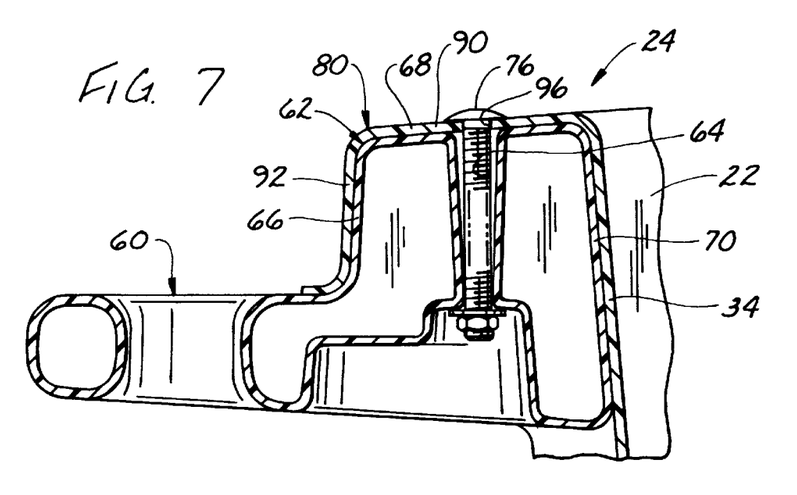
FIG. 7 is an enlarged, fragmented cross-sectional view of a handle of the transportable container taken along the plane of line 7—7 in FIG. 5.
Figure 8:
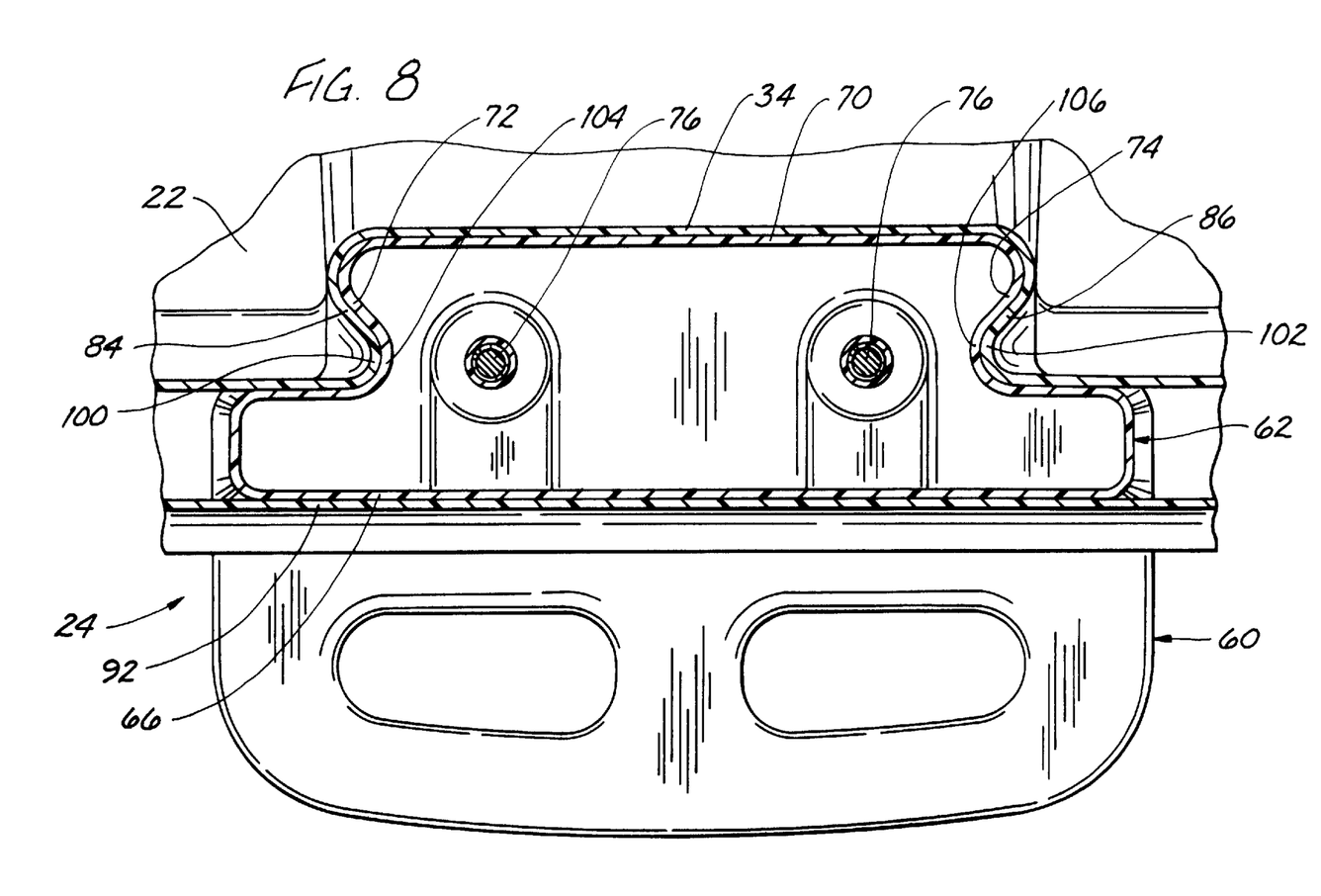
FIG. 8 is an enlarged, fragmented cross-sectional view of the handle of the transportable container taken along the plane of line 8—8 in FIG. 2.

Details of the handle 24 are shown in FIGS. 7 and 8. Preferably, the handle 24 is of a polymeric material, such as polyethylene. Preferably, the handle is formed by rotational molding as a monolithic piece. However, other suitable materials may be used, and other methods for forming the handle 24 may be employed, without departing from the scope of the present invention. The handle 24 includes a generally transverse hand-engageable portion 60 and a mounting portion 62 extending generally upwardly from the rear portion of the hand-engageable portion 60. As shown in FIGS. 7 and 8, the mounting portion 62 of the handle 24 has a front wall 66, a top wall 68, a rear wall 70, a left side wall 72 and a right side wall 74. As shown in FIG. 7, the mounting portion 62 of the handle 24 includes a pair of vertically disposed holes 64 adapted to receive mechanical fasteners, such as bolts 76, for securing the handle 24 to the container body 22, as described below.

The container body 22 includes a flange 80 surrounding the opening in the top of the container body 22. The flange comprises an upper edge margin of each of the front end wall 34, rear end wall 36, and first and second side walls 38 and 40 of the container body 22. As best shown in FIG. 1, the front end wall 34 includes a recessed center section 82 flanked by generally vertical left and right side shoulders 84 and 86. A section of the flange 80 that passes over the recessed center section 82 of the front end wall 34 between the shoulders 84 and 86 is wider than the rest of the flange 80, and defines a handle-receiving socket, the function of which is described more fully below.

The section of the flange 80 that passes over the recessed center section 82 of the front end wall 34 includes an outwardly extending first flange portion 90 and a downwardly extending second flange portion 92. As best shown in FIG. 7, the first flange portion 90 extends generally horizontally from the front end wall 34, and the second flange portion 92 extends generally downwardly from a distal end of the first flange portion so that the front end wall 34 and the second flange portion 92 are in a generally parallel spaced relationship. Thus, the front end wall 34, first flange portion 90 and second flange portion 92 together define a handle-receiving socket adapted to receive the mounting portion 62 of the handle 24 therein for mounting of the handle 24 to the container body 22. Preferably, the first and second flange portions 90 and 92 are of a monolithic construction and, more preferably, the first flange portion 90, second flange portion 92, and front end wall 34 are of a monolithic construction.

As shown in FIG. 7, when the mounting portion 62 of the handle 24 is received within the socket, the rear wall 70 of the mounting portion 62 engages the front end wall 34 of the container body, and front wall 66 of the mounting portion 62 engages the second flange portion 92. Thus, the mounting portion 62 of the handle 24 and the handle-receiving socket are configured to resist longitudinal (i.e., forward and rearward) movement of the handle 24 relative to the container body 22 when the mounting portion 62 of the handle 24 is received within the socket. No mechanical fasteners are necessary for resisting longitudinal movement of the handle 24 relative to the container body 22. Also, when the mounting portion 62 of the handle 24 is received within the socket, the top wall 68 of the mounting portion 62 engages the first flange portion 90. Thus, the mounting portion 62 of the handle 24 and the handle-receiving socket are also configured to resist vertical movement of the handle 24 relative to the container body 22 when the mounting portion 62 of the handle 24 is received within the socket.

As discussed above, in the preferred embodiment of the invention, the mounting portion 62 of the handle 24 is secured to the container body 22 with mechanical fasteners, such as bolts 76. As shown in FIG. 7, holes 96 in the first flange portion 90 are in register with the holes 64 in the handle 24, and bolts 76 pass through the holes 64 in the handle 24 and through the holes 96 in the first flange portion 90 for securing the handle 24 to the container body 22.

The mounting portion 62 of the handle 24 and the handle-receiving socket are also configured to resist lateral movement of the handle 24 relative to the container body 22 when the mounting portion 62 of the handle 24 is received within the socket. As discussed above, the front end wall 34 of the container body 22 includes a recessed center section 82 flanked by generally vertical left and right side shoulders 84 and 86. As shown in FIG. 8, the shoulders 84 and 86 define left and right side margins of the handle-receiving socket. When the mounting portion 62 of the handle 24 is received within the socket, the left side wall 72 of the mounting portion 62 engages the left shoulder 84 of the front end wall 34, and the right side wall 74 of the mounting portion 62 engages the right shoulder 86 of the front end wall 34. Thus, the mounting portion 62 of the handle 24 is held between the shoulders 84 and 86, and the handle-receiving socket is therefore able to resist lateral movement of the handle 24 relative to the container body 22, without having to rely on mechanical fasteners to do so.

As shown in FIG. 8, in the preferred embodiment of the invention, the left shoulder 84 of the front end wall 34 includes a first projection 100 that projects into the handle-receiving socket, and the right shoulder 86 of the front end wall 34 includes a second projection 102. The left side wall 72 of the mounting portion 62 of the handle 24 includes a first recess 104 adapted to receive the first projection 100 when the mounting portion 62 of the handle 24 is received within the handle-receiving socket, and the right side wall 74 of the mounting portion 62 includes a second recess 106 adapted to receive the second projection 102. The engagement of the projections 100 and 102 with the recesses 104 and 106 provides even further resistance to longitudinal movement of the handle 24 relative to the container body 22 when the mounting portion 62 of the handle 24 is received within the socket, without having to rely on mechanical fasteners to do so.

Figure 12:
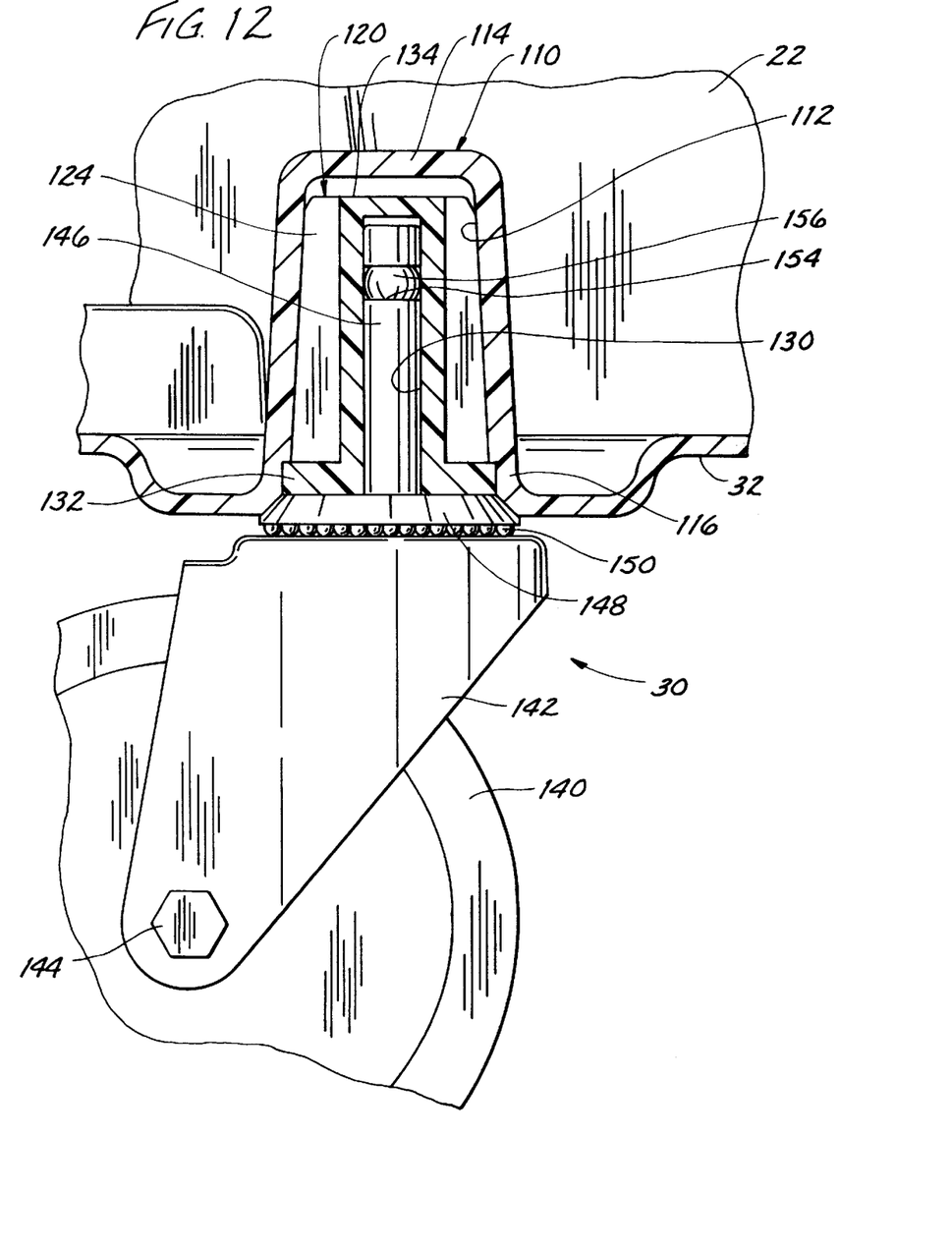
FIG. 12 is an enlarged, fragmented cross-sectional view of a caster socket and a caster assembly of the transportable container taken along the plane of line 12—12 of FIG. 6.

Details of the mounting arrangement for the caster assemblies 30 are shown in FIG. 12. The base 32 of the container body 22 has a caster socket 110 formed therein. Preferably, the container body 22 and caster socket 110 are of a monolithic construction, molded as a single piece. Preferably, the caster socket 110 has a generally cylindrical interior side surface 112 and a closed upper end 114. A lower end 116 of the caster socket 110 is open.

Figure 9:
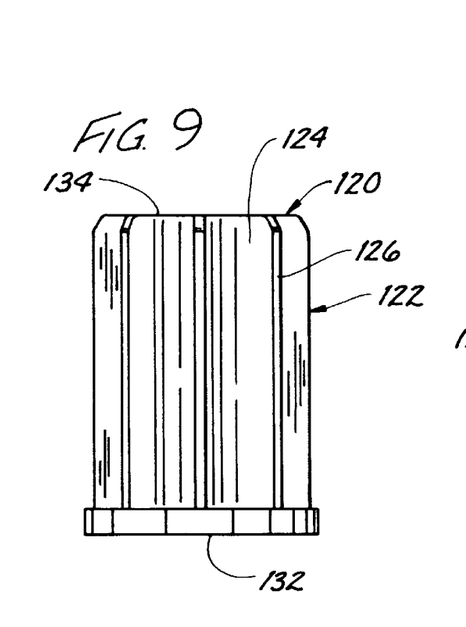
FIG. 9 is a side elevational view of a sleeve member of the transportable container of the present invention.
Figure 10:
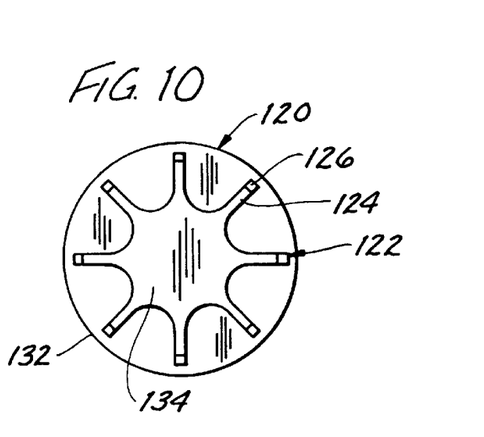
FIG. 10 is a top plan view of the sleeve member of FIG. 9.

A sleeve member 120 has an outer surface 122 defined by a plurality of projections 124 that extend radially outwardly. As shown in FIGS. 9 and 10, in the preferred embodiment of the invention, the projections 124 are vertically disposed fins spaced from one another circumferentially around the sleeve member 120. Each of the projections 124 has a distal end 126. As discussed below, the caster socket 110 is sized to receive the sleeve member 120 therein in a frictional engagement. The distal ends 126 of the projections 124 are adapted for engagement with the interior side surface 112 of the caster socket 110 when the sleeve member 120 is received within the caster socket 110. The caster socket 110 and sleeve member 120 are preferably sized so that the sleeve member 120 is received within the caster socket 110 in an interference fit engagement. Although the caster socket 110 has been described as having a generally cylindrical interior side surface 112, the interior side surface could have other shapes (e.g., triangular, square, hexogonal, etc.) without departing from the scope of the invention. It is only important that the caster socket 110 and sleeve member 120 have generally mating shapes so that the sleeve member 120 can be received within the caster socket 110 in an interference fit engagement.

As discussed below in more detail, in the preferred embodiment of the invention, the caster socket 110 is formed from a curable polymeric material, such as polyethylene, that tends to shrink upon curing, so that the sleeve member 120 is received within the caster socket 110 in a shrink fit engagement once the caster socket 110 is fully cured.

Figure 11:
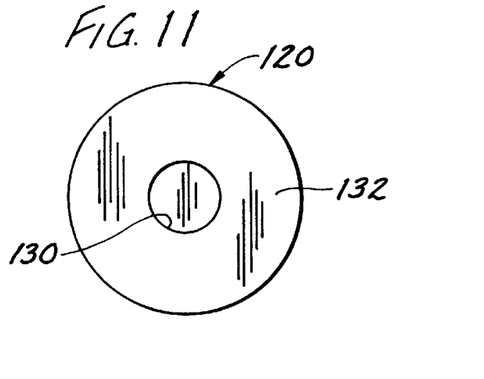
FIG. 11 is a bottom plan view of the sleeve member of FIG. 9.

As shown in FIGS. 11 and 12, the sleeve member 120 having an axial hole 130 extending from a bottom end 132 of the sleeve member 120 toward a top end 134 of the sleeve member 120.

Each of the caster assemblies, generally indicated by the reference numeral 30, includes a wheel 140 rotatably mounted to a fork 142 by an axle pin 144. A generally cylindrical pintle 146 is rotatably mounted to an upper portion of the fork 142. A ball race portion 148 containing a plurality of ball bearings 150 is connected to the pintle 146 in a conventional manner, facilitating rotation of the fork 142 relative to the pintle 146.

The axial hole 130 in the sleeve member 120 is sized to receive the pintle 146 therein (see FIG. 12) for mounting the caster assembly 30 to the container body 22 when the sleeve member 120 is received within the caster socket 110. As shown in FIG. 12, the pintle 146 preferably includes an annular groove 154 near its upper end. A resilient split C-ring 156 is positioned within the groove 154 in a manner to substantially circumscribe the pintle 146. In a relaxed condition of the C-ring (not shown), the C-ring 156 has an outside diameter greater than the pintle 146. However, the C-ring 156 is resiliently compressible for sliding the pintle 146 in and out of the axial bore 130 of the sleeve member 120. The C-ring 156 serves as a retaining member for retaining the pintle 146 within the sleeve member 120. Preferably, the axial bore 130 of the sleeve member 120 includes an annular obstruction (not shown), such as an annular groove or an annular ridge. The C-ring 156 is adapted for resilient engagement with the annular obstruction in a manner to retain the pintle 146 in the sleeve member 120.

A method of the present invention is for mounting the caster assemblies 30 to the container body 22. In general, the method comprises the steps of: forming the container body 22 from a curable polymeric material in a manner so that the container body 22 and the caster socket 110 are formed as a monolithic piece; providing the sleeve member 120 described above; inserting the sleeve member 120 into the caster socket 110, preferably before the curable polymeric material of the container body 22 is fully cured; and allowing the curable polymeric material of the container body 22 to fully cure. The container body 22 and caster socket 110 are formed from a curable polymeric material, such as polyethylene, that tends to shrink upon curing, so that the sleeve member 120 is received within the caster socket 110 in a shrink fit engagement once the caster socket 110 is fully cured. Preferably, the step of inserting the sleeve member 120 into the caster socket 110 is performed sufficiently prior to the curable polymeric material of the container body 22 being fully cured (i.e., while the curable polymeric material is still hot) so that sufficient shrinkage of the curable polymeric material of the caster socket 110 will occur after the sleeve member 120 has been inserted into the caster socket 110 so that the curable polymeric material of the caster socket 110 shrinks around the outer surface 122 of the sleeve member 120 as it cures to retain the sleeve member 120 in the caster socket 110, without the need for mechanical fasteners. Alternatively, the sleeve member 120 may be forced into the caster socket 110 (e.g., by hammering the sleeve member 120 into the caster socket 110) some time after the curable polymeric material of the container body 22 has fully cured. If the sleeve member 120 is to be forced into the caster socket 110 after the curable polymeric material of the container body 22 has fully cured, temporary re-heating of the caster socket 110 may facilitate insertion of the sleeve member 120.

Preferably, the container body 22 and caster socket 110 are rotationally molded from polyethylene as a monolithic piece. However, other suitable materials could be used, and other methods for forming the container body 22 and caster socket could be employed, without departing from the scope of the present invention. Preferably, the method of the present invention further comprises the steps of providing a caster assembly 30 as described above; and inserting the pintle 146 of the caster assembly 30 into the axial hole 130 of the sleeve member 120 to mount the caster assembly 30 to the container body 22.

In view of the above, it will be seen that the objects of the invention have been achieved and other advantageous results attained. As various changes could be made without departing from the scope of the invention, it is intended that all matter contained in the above description or shown in the accompanying drawings shall be interpreted as illustrative and not in a limiting sense.

What is claimed is:

1. A transportable container comprising:

a container body having a base and a plurality of sidewalls extending generally upwardly from the base to define a container interior, one of said sidewalls constituting a generally vertical first sidewall, the first sidewall having an interior side and an exterior side, the first sidewall including a flange, the flange comprising a first flange portion extending outwardly from the exterior side of the first sidewall and a second flange portion extending generally downwardly from a distal end of the first flange portion, the first sidewall, first flange portion and second flange portion together defining a socket; and a handle having a hand-engageable portion and a mounting portion extending from the hand-engageable portion, the mounting portion of the handle being received in the socket in a manner for mounting the handle to the container body, the mounting portion of the handle including spaced front and rear walls, the front and rear walls of the mounting portion being adapted for engagement with the first sidewall and second flange portion of the container body in a manner to prevent forward and rearward movement of the handle relative to the container body when the mounting portion of the handle is received in the socket.

2. The container of claim 1 wherein the outwardly extending first flange portion and the mounting portion of the handle are configured to resist upward movement of the handle relative to the container body when the mounting portion of the handle is received within the socket.

3. The container of claim 1 wherein the first sidewall, first flange portion and second flange portion are of a monolithic construction.

4. The container of claim 1 wherein the hand-engageable portion of the handle and the mounting portion of the handle are of a monolithic construction.

5. The container of claim 1 wherein the mounting portion of the handle is connected to the first flange portion of the first sidewall with mechanical fasteners.

6. The container of claim 1 wherein the handle is entirely of a polymeric material.

7. The container of claim 1 wherein the flange is entirely of a polymeric material.

8. The container of claim 1 wherein the exterior side of the first sidewall includes a first shoulder adapted for engagement with a first side surface of the handle and a second shoulder adapted for engagement with a second side surface of the handle in a manner to prevent lateral movement of the handle relative to the container body when the mounting portion of the handle is received within the handle-receiving socket.

9. The container of claim 8 wherein the first and second shoulders each include a projection that projects into the handle-receiving socket, the first side surface of the handle having a first recess and the second side surface having a second recess, the first and second recesses being adapted to receive the first and second projections when the mounting portion of the handle is received within the handle-receiving socket.

10. The container of claim 1 wherein the base of the container body includes a caster socket, the caster socket having an interior surface with a closed upper end and an open lower end;

the container further comprising a sleeve member and a caster assembly, the sleeve member having an outer surface adapted for engagement with the interior surface of the caster socket, the caster socket being sized to receive the sleeve member therein in a frictional engagement, the sleeve member having an axial hole extending from a bottom end of the sleeve member toward a top end of the sleeve member, the caster assembly having a pintle, the axial hole in the sleeve member being sized to receive the pintle of the caster assembly therein for mounting the caster assembly to the container body.

11. The container of claim 10 wherein the container body, the flange, and the caster socket are of a monolithic construction.

12. A transportable container comprising:

a container body having a generally horizontal base and a plurality of sidewalls extending generally upwardly from the base, the sidewalls and the base together defining a container interior adapted for containing and transporting materials, a portion of the base being molded to form a generally cylindrical caster socket that extends upwardly from the base, the caster socket having an open lower end that is generally coplanar with the base and a closed upper end that is exposed to and partially defines the container interior;

a sleeve member having an outer surface adapted for engagement with the interior surface of the caster socket, the caster socket being sized to receive the sleeve member therein in a frictional engagement, the sleeve member having an axial hole extending from a bottom end of the sleeve member toward a top end of the sleeve member; and a caster assembly having a pintle, the axial hole in the sleeve member being sized to receive the pintle of the caster assembly therein for mounting the caster assembly to the container body.

13. The transportable container of claim 12 wherein the container body and caster socket are of a monolithic construction.

14. The transportable container of claim 12 wherein the container body and caster socket are formed entirely of polymeric materials.

15. The transportable container of claim 12 wherein the caster socket and sleeve member are sized so that the sleeve member is received within the caster socket in an interference fit engagement.

16. The transportable container of claim 12 wherein the caster socket is formed from a curable polymeric material that tends to shrink upon curing, and wherein the caster socket and sleeve member are sized so that the sleeve member is received within the caster socket in a shrink fit engagement.

17. The transportable container of claim 15 wherein the outer surface of the sleeve member is defined by a plurality of projections that extend radially outwardly, each of the projections having a distal end adapted for engagement with the interior surface of the caster socket when the sleeve member is received within the caster socket.

18. The transportable container of claim 17 wherein the projections are vertically disposed fins spaced from one another circumferentially around the sleeve member.

19. The transportable container of claim 12 wherein the pintle includes a retaining member, the retaining member being adapted for resilient engagement with an interior wall of the axial bore of the sleeve member in a manner to retain the pintle in the sleeve member.

20. The transportable container of claim 19 wherein the pintle includes an annular groove, and wherein the retaining member is a resilient C-ring positioned in the annular groove in a manner to partially circumscribe the pintle.

21. The transportable container of claim 12 wherein one of said sidewalls constitutes a generally vertical first sidewall, the first sidewall having an interior side and an exterior side;

the container further comprising a handle having a hand-engageable portion and a mounting portion extending from the hand-engageable portion;

the first sidewall including a flange, the flange comprising an upper edge margin of the first sidewall, the flange having an outwardly extending first flange portion and a downwardly extending second flange portion, the first sidewall, first flange portion and second flange portion together defining a socket adapted to receive the mounting portion of the handle therein for mounting of the handle to the container body.

22. The transportable container of claim 21 wherein the container body, the flange, and the caster socket are of a monolithic construction.

23. A transportable container comprising:

a container body having a base and a plurality of sidewalls extending generally upwardly from the base to define a container interior, the container body including an upper rim flange extending around at least a portion of the container body and comprising an upper edge margin of at least a portion of one of the side walls, the flange being shaped and adapted to define a socket having an opening that faces generally downwardly; and a handle having a hand-engageable portion and a mounting portion extending from the hand-engageable portion, the mounting portion of the handle being received in the socket in a manner for mounting the handle to the container body, the mounting portion of the handle including spaced front and rear walls, the front and rear walls of the mounting portion being adapted for engagement with front and rear facing interior surfaces of the socket in a manner to prevent forward and rearward movement of the handle relative to the container body when the mounting portion of the handle is received in the socket.

24. The container of claim 23 wherein the container body and the flange are of a monolithic construction.

25. The container of claim 23 wherein the base of the container body includes a caster socket, the caster socket having an interior surface with a closed upper end and an open lower end;

the container further comprising a sleeve member and a caster assembly, the sleeve member having an outer surface adapted for engagement with the interior surface of the caster socket, the caster socket being sized to receive the sleeve member therein in a frictional engagement, the sleeve member having an axial hole extending from a bottom end of the sleeve member toward a top end of the sleeve member, the caster assembly having a pintle, the axial hole in the sleeve member being sized to receive the pintle of the caster assembly therein for mounting the caster assembly to the container body.

26. A transportable container comprising:

a container body having a generally horizontal base and a plurality of sidewalls extending generally upwardly from the base, the base having an upwardly facing surface and a downwardly facing surface, the sidewalls and the upwardly facing surface of the base together defining a container interior adapted for containing and transporting materials, the base being molded to form an integral wheel-mounting socket in a manner so that a portion of the downwardly facing surface of the base defines a generally cylindrical interior surface of the wheel-mounting socket having an open lower end and so that a portion of the upwardly facing surface of the base defines a generally cylindrical exterior surface of the caster socket that is exposed to and partially defines the container interior;

a sleeve member having a first end and a second end and an outer surface adapted for engagement with the interior surface of the wheel-mounting socket, the wheel-mounting socket being sized to receive the sleeve member therein in a functional engagement, the sleeve member having an axial hole extending from the second end of the sleeve member toward the first end of the sleeve member; and a wheel assembly having a pintle, the axial hole in the sleeve member being sized to receive the pintle of the wheel assembly therein for mounting the wheel assembly to the container body.

27. The container of claim 26 wherein the wheel assembly is a caster assembly and wherein the pintle and axial hole are disposed generally vertically.

28. The transportable container of claim 26 wherein the container body and wheel-mounting socket are of a monolithic construction.

29. The transportable container of claim 26 wherein the container body includes a base and a plurality of sidewalls extending generally upwardly from the base to define a container interior, the container body including an upper rim flange extending around at least a portion of the container body and comprising an upper edge margin of at least a portion of one of the side walls, the flange being shaped and adapted to define a socket having an opening that faces generally downwardly; and a handle having a hand-engageable portion and a mounting portion extending from the hand-engageable portion, the mounting portion of the handle being received in the socket in a manner for mounting the handle to the container body.

30. The container of claim 23 wherein an exterior side of said one of the sidewalls includes a first shoulder adapted for engagement with a first side surface of the handle and a second shoulder adapted for engagement with a second side surface of the handle in a manner to prevent lateral movement of the handle relative to the container body when the mounting portion of the handle is received within the socket.

* * * * *